US012566619B1

(12) United States Patent
Jayapal et al.

(10) Patent No.: US 12,566,619 B1
(45) Date of Patent: Mar. 3, 2026

(54) REAL TIME EVENT TRIGGERING FOR PRESENTING A PAGE VIA A USER INTERFACE

(71) Applicant: Amazon Technologies, Inc., Seattle, WA (US)

(72) Inventors: Priyadevi Jayapal, Sammamish, WA (US); Varsha Shankar, Woodbridge (CA)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 18/435,886

(22) Filed: Feb. 7, 2024

(51) Int. Cl.
| | |
|---|---|
| *G06F 3/048* | (2013.01) |
| *G01C 21/36* | (2006.01) |
| *G06F 3/0481* | (2022.01) |
| *G06F 9/451* | (2018.01) |
| *H04M 1/72463* | (2021.01) |

(52) U.S. Cl.
CPC ......... *G06F 9/451* (2018.02); *G01C 21/3626* (2013.01); *G06F 3/0481* (2013.01); *H04M 1/72463* (2021.01)

(58) Field of Classification Search
CPC .. G06F 9/451; G06F 3/0481; H04M 1/72463; G01C 21/3626
See application file for complete search history.

(56) References Cited

U.S. PATENT DOCUMENTS

| | | | | |
|---|---|---|---|---|
| 10,198,707 | B1 * | 2/2019 | Bolton | G06Q 10/08355 |
| 11,526,831 | B1 * | 12/2022 | Rafii | G06F 3/0487 |
| 2018/0315319 | A1 * | 11/2018 | Spector | G08G 1/0104 |
| 2019/0220785 | A1 * | 7/2019 | Tanno | G06Q 10/083 |
| 2021/0158283 | A1 * | 5/2021 | DeLuca | G06Q 30/0631 |
| 2022/0245545 | A1 * | 8/2022 | Tripathy | G06Q 10/06312 |

* cited by examiner

*Primary Examiner* — Mahelet Shiberou

(74) *Attorney, Agent, or Firm* — Kilpatrick Townsend & Stockton LLP

(57) ABSTRACT

Techniques for real time event triggering for presenting a page via a user interface are disclosed. In an example, a user device receives and presents instructions related to providing a service at a user interface. The user device also receives a rule associated with the service and indicating that feedback data is to be requested when a first condition related to a deviation from the instruction is met. The user device stores user data indicating a second condition to present a page configured to collect the feedback data. Based at least in part on sensor data, the user device determines that the first condition is met. Based at least in part on device data, the user device determines the second condition is met. Accordingly, the user device presents the page in the user interface and receives receiving the feedback data via the page.

20 Claims, 10 Drawing Sheets

100

Receive instructions 202

Present the instructions 204

Receive a rule 208

Store user data 210

Determine that first condition associated with deviation from instructions and second condition associated with page presentation are met 212

Request feedback data from user 214

Receive feedback data 216

Send feedback data to server 218

Display 604

User Profile 606

Delivery Instructions 608

Feedback Request Page 610

Image Data 612

Vehicle 602

REAL TIME EVENT TRIGGERING FOR PRESENTING A PAGE VIA A USER INTERFACE

BACKGROUND

Different computing services are available via user devices. Some of these services can be available from remote servers. For example, consider the use case of a delivery service. The delivery service can be hosted on a server. A driver can operate a user device that executes a delivery application to connect to the server and interact with the delivery service. The delivery application can present delivery information such as a map of delivery locations, delivery routes, route breaks, and the like.

BRIEF DESCRIPTION OF THE DRAWINGS

Various embodiments in accordance with the present disclosure will be described with reference to the drawings, in which.

DETAILED DESCRIPTION

Figure 1:
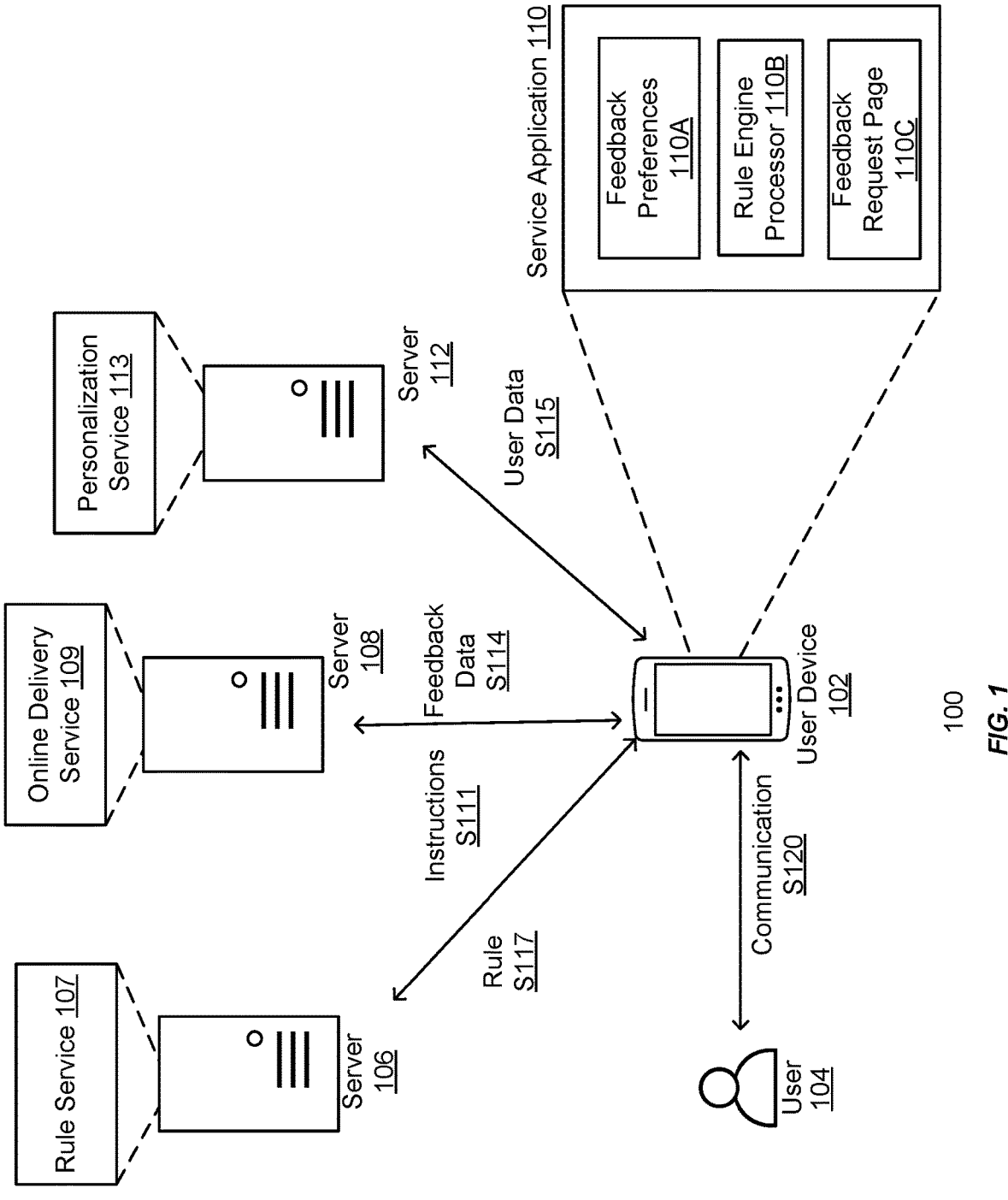
FIG. 1 illustrates an example of a system performing a condition-based deviation detection and requesting feedback via a feedback page, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques to real time event triggering for presenting a page via a user interface. In an example, an online service is hosted on a server and is accessible to a user device (e.g., via an application executing on the user device). The online service can provide instructions that are presented in a user interface of the application. The online service can be improved (e.g., its program code updated) based on feedback data collected via the application about the use of such instructions. To do so, the same or a different server can send, to the device, a rule indicating a first condition to present a page (e.g., via the user interface of the application). The first condition can relate to a deviation from the instructions. User data (e.g., a user setting indicating a user preference) can also be stored by the user device and can indicate a second condition to present the page. The second condition can relate to timing and/or location associated with presenting the page. The rule and the user data can be integrated with the application (e.g., stored as part of the program code or as part of a set of files of the application). Based on sensor data of the user device, the application can determine that the first condition is met (e.g., a deviation has occurred). Based on additional data of the user device, the application can determine that the second condition is met (e.g., that presenting the page is now permitted). Accordingly, the page is automatically presented via the user interface. User input is received at the page, resulting in feedback data being generated. The user device can send the feedback data to the same or a different server. In turn, the feedback data is processed to improve the online service. As such, the user device acts as a collection sensor to automatically collect feedback data when a particular set of conditions is met. In turn, this use of the user device as a collection sensor can improve the underlying online service.

To illustrate, consider an example use case of an online delivery service. Here, a first server executes the online delivery service and sends instructions to a user device executing a delivery application. The user device is operated by a delivery driver. The delivery application is associated with a user profile of the delivery driver and presents the instructions. These instructions are defined, at least in part, based on the user profile and indicate a particular delivery route to be followed including, for example, a location at which the delivery driver needs to be at a particular time (e.g., arrive at location "XYZ" between 8:00 am and 8:15 am). A second server can send a rule to the user device. The rule can indicate that a deviation from the particular delivery route should trigger collection of feedback regarding how routes are defined for the delivery driver. A user setting of the application can indicate that the feedback collections is permitted within a time frame (e.g., between 2:00 μm and 3:00 pm). While in use, the application can receive location data of a location sensor of the user device and timing data of a clock signal of the user device. Based on such data, the application determines that the user device was, at the particular time (between 8:00 am and 8:15 am), at a different location (e.g., location "ABC") than the location of the route. Accordingly, the application determines that a deviation from the route has occurred. Given the timing data and the user setting, the application can automatically present a feedback page within the time frame (e.g., at 2:15 pm). This feedback page can include fields (which may be specified by the rule) to collect the feedback. User input is received via the feedback page and can indicate that the location is inaccessible at the particular time (e.g., location "XYZ" cannot be accessed until after 9:00 am). Accordingly, the user device generates and sends feedback data to the first server. In turn, the online delivery service is updated such that any subsequent delivery route planning would instruct arriving to the location at a different time (e.g., arrive at location "XYZ" between 9:00 am and 9:15 am), thereby improving the effectiveness and usability of the online delivery service.

Embodiments of the present disclosure provide various technological advantages over a conventional computer system. For example, and unlike a conventional computer system, embodiments of the present disclosure configure user devices to act as collection sensors that, based on a set of conditions being met, automatically present pages for collecting data. Furthermore, the collected data has better quality than conventional computer system because it is collected in a timely and effective manner. Accordingly, the improvements to the underlying online service are significantly more than what may be achieved by using the conventional computer system. In a further example, a page is automatically presented at a user interface (e.g., with minimum user interactions, if any) upon the conditions being met. Thus, the navigation via the user interface to access the page is significantly improved relative to the conventional computer system that would have, otherwise, necessitated more complex navigation involving multiple user interactions with the user interface to access the page.

In the interest of clarity of explanation, embodiments of the present disclosure are described in the context of a delivery use case. However, the embodiments are not limited as such. Instead, the embodiments similarly and equivalently apply to any use case, where a service is provided via a user device executing an application, such that the application can automatically (based on a set of conditions being met, where the conditions are specified by rules and user data) present a page to collect feedback data related to the service.

Furthermore, the delivery use case can involve different types of services. One of the services may be a delivery service, where a driver delivers items along a route. Other examples of services may include a pick-up service (e.g., a driver picking items along a route), a return service (e.g., a driver or an end user returning a set of items), a transfer service (e.g., a driver transferring items between two or more locations), etc. Each of these services can be hosted on the same or different set of servers and can associated with the same or a different set of applications executing on a user device.

FIG. 1 illustrates an example of a system performing a condition-based deviation detection and requesting feedback via a feedback page, according to embodiments of the present disclosure. A user 104 (interchangeably, a "driver" in the illustrative delivery use case) operates a user device 102 that executes a service application 110. The user device 102 may be any device capable of communicating with a server such as, for example, a smartphone, smart watch, wearable device (e.g., smart glasses), etc. The user device 102 receives and sends data from servers 106, 108, and 112. At least one of the servers (e.g., the server 108) provides an online delivery service 109 (and possibly many different types of online services) accessible via the service application 110. Another one of the servers (e.g., the server 106) provides a rule service 107 defining rules to collect feedback related to the online delivery service 109 (and possibly to the other online services) from the user device 102 (and possibly from other user devices). Yet the remaining server (e.g., the server 112) can provide a personalization service 113 related to user preferences for collected the feedback. Although the servers are illustrated as being distinct from each other, two or more of these servers may be combined.

In an example, the rule service 107 and the server 106 may receive input of operators via computing devices, where the operators are from different teams, and where the input defines the rules. These teams may include teams dedicated to navigation, safety, map, legal, etc. Each team may indicate a different rule set for the same delivery service. The inputs that may be provided by the one or more teams can specify the conditions that need to be met. For example, the safety team can specify a rule for presenting the feedback request page, where the rule is based on a deviation that indicates an unsafe operation (e.g., if the user had to travel at a high speed to complete their deliveries, the high speed traveling can be unsafe, and feedback about the reason for the high speed should be collected).

As illustrated, the service application 110 may be associated with a user profile of the user (e.g., the user can log in to the online delivery service 109 via the service application based on their user profile). In an example, the service application 110 stores feedback preferences 110A (as part of user settings or an application file). The service application 110 also includes a rule engine processor 110B (e.g., as part of executable program code). The rule engine processor 110B can process rules (e.g., received from the server 106) and feedback preferences 110A (which may be defined based on the output of the personalization service 113) to present a feedback request page 110C at a user interface (e.g., a graphical user interface and/or a voice user interface).

In an example, the user device 102 receives (shown as part of a step 111) a set of instructions from the server 108, where the instructions relate to an execution of the online delivery service 109 and are associated with the user profile. For example, the instructions indicate a delivery route to be followed to deliver items to multiple locations. These instructions may indicate where to drop off deliveries, which route to take, and when to take breaks. From the server 106, the user device 102 receives (shown as part of a step 117) a rule (or multiple rules).

The rule is associated with the online delivery service 109. For example, the rule indicates that feedback data is to be requested when a condition related to a deviation from the instructions is met. The deviation may relate to a route navigation, a route sequence, a break suggestion, and delivery quality (e.g., delivery failures), and/or other delivery service parameters (e.g., location parameters, timing parameters, item parameters, etc.). Generally, the rule is usable to determine when a deviation from the instructions warrants a request for feedback data. For example, the rule might indicate that if a driver is off route for longer than thirty minutes, a request for feedback should be sent. If a driver is only off-route for a few minutes, while that is a deviation, the rule would not trigger a request for feedback data. The rules may be processed by the rule engine processor 110B for determining whether a rule-specified condition has been satisfied.

As illustrated in FIG. 1 part of a step 115, the user device 102 may receive, user data that is usable to device the feedback preferences 110. For example, the user data can indicate a user setting of the service application 110. The user setting can define when, where, and/or how the feedback request page 110C can be presented. As such, the user data can indicate, generally, a condition (time, location, and/or other parameters) that, when met, triggers the automatic presentation feedback request page 110C (e.g., without user interaction with the service application 110 to explicitly request the feedback request page 110C). To illustrate this, a driver might prefer to receive a request message only while they are on a break and thus, if the driver was greater than thirty minutes off-route during the delivery and is on a break, a feedback request page 110C can be presented.

The rule engine processor 110B may also determine how the request should be formatted on the feedback request page 110C. For example, it might be more appropriate to ask the driver an open-ended question such as "What was the reason for the deviation from your route?" or it might be more beneficial to ask "Were you taking a break during the time that we detected you were off-route?" The request format can be specified by the rule. For instance, the rule can define multiple feedback fields. Each feedback field can request a specific type of feedback input.

In an example, sensor data and device data of the user device 102 can be used by the rule engine processor 110B to determine if the rule-specified condition(s) and/or user data-specified condition(s) are met to trigger the presentation of the feedback request page 110C. The sensor data can be generated by one or more sensors of the user device 102 (e.g., location data generated by a location sensor, acceleration data generated by an accelerometer, inertial measurement unit (IMU) data generated by an IMU, etc.). The device data can include the sensor data and/or other data, such as timing data generated by a clock signal of the user device 102. If the condition(s) are met, the rule engine processor 110B can present the feedback request page 110C. The presentation can be formatted according to the predefined feedback fields. It is possible that the rule engine processor 110B can implement or interact with a machine learning model (e.g., a large language model (LLM)) to format and/or present feedback request page 110C and/or process the user input received at the feedback request page to further format the feedback request page 110C or to generate feedback data.

The feedback request page 110C can be presented in a user interface of the eservice application 110. This user interface can be a graphical user interface. In this case, the feedback request page 110C can be presented as a document having input fields. Additionally, or alternatively, the user interface can be a voice user interface. In this case, the feedback request page 110C can be presented as part of a natural language conversation.

The user 104 may input feedback at the feedback request page 110C on the user device 102 (show an as part of a step 120). Based on this input, the user device 102 may generate and send the feedback data (shown as part of a step 114) to the server 108. The server 108 may process the feedback data to improve the online delivery service 108 specifically for the use profile and/or categorically across multiple user profiles. For example, and as described in greater detail below, the first server may use a machine learning module to improve route instructions with the provided feedback data.

The communication networks that allow the entities in FIG. 1 to communicate may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocol such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

It should be noted that the inclusion of three servers in the FIG. 1 is exemplary and should not be construed as limiting the claims. Each one of the exemplary server computers may comprise a processor. The processor may be coupled to a memory, a network interface, and a computer readable storage medium. The computer readable storage medium can store program code for a feature module, a training module, an evaluation module, and a machine learning model.

The memory can be used to store data and code. For example, the memory can store input data, features, machine learning models, weights, etc. The memory may be coupled to the processor internally or externally (e.g., cloud based data storage), and may comprise any combination of volatile and/or non-volatile memory, such as RAM, DRAM, ROM, flash, or any other suitable memory device.

The feature module may comprise code or software, executable by the processor, for determining and/or evaluating features. The feature module, in conjunction with the processor, can extract features from a dataset. Feature extraction can start from an initial set of measured data (e.g., data from the dataset). The feature module, in conjunction with the processor, can obtain the dataset from a memory or database. The feature module, in conjunction with the processor, can build derived values (e.g., features) from the dataset that can be intended to be informative and non-redundant, facilitating the subsequent learning and generalization steps, and in some cases leading to better human interpretations. Feature extraction can be related to dimensionality reduction of the dataset.

The training module can include code or software, executable by the processor, for training machine learning model(s). The process of training a machine learning model involves providing a machine learning algorithm with training data to learn from. The training module, in conjunction with the processor, can input training data into the machine learning model for training. The training data can include labels that indicate the target attribute of the data (e.g., a label indicating a value and rank that the machine learning model is trained to determine).

The evaluation module can include code or software, executable by the processor, for evaluating data and machine learning model(s). The evaluation module, in conjunction with the processor, can utilize the trained machine learning model to obtain predictions on new data for which the target is unknown.

The network interface may include an interface that can allow the central server computer to communicate with external computers. Some examples of the network interface may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface may include Wi-Fi™. Data transferred via the network interface may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 2:
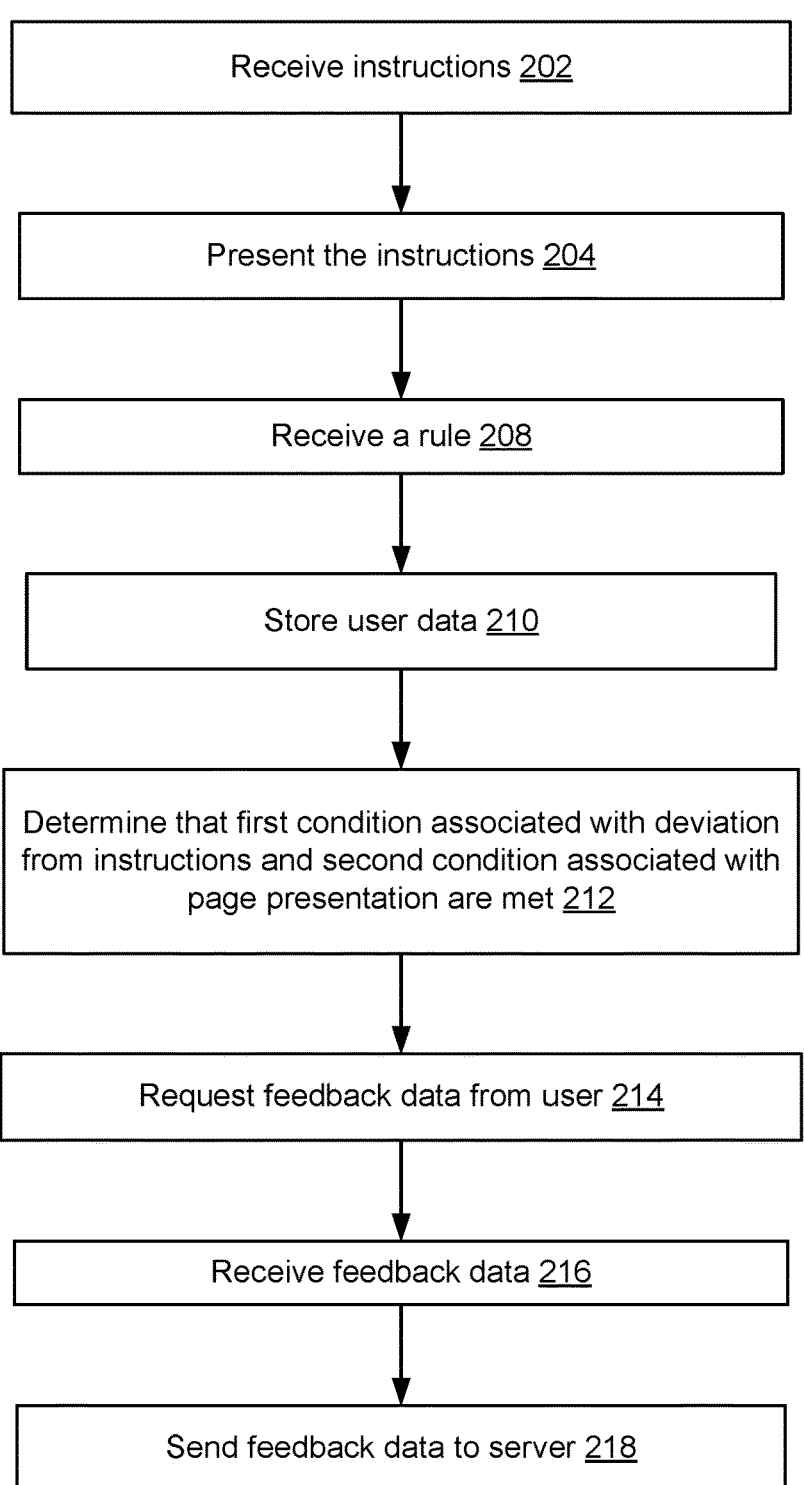
FIG. 2 illustrates an example of a flow for receiving instructions and detecting deviations based on stored conditions, according to embodiments of the present disclosure.

FIG. 2 illustrates an example of a flow for receiving instructions and detecting deviations based on stored conditions, according to embodiments of the present disclosure. As described below, operations of the flow can be performed by a user device (e.g., the user device 102 of FIG. 1). Some or all of the instructions for performing the operations can be implemented as hardware circuitry and/or stored as computer-readable instructions on one or more computer-readable storage media of the user device. As implemented, the instructions represent modules that include circuitry or code executable by processor(s) of the user device. The use of such instructions configures the user device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 202 where the user device receives instructions. The instructions 202 may be received from a server (e.g., the server 108) and relates to an online delivery service. The server can send the instructions to the user device based on a user profile associated with a service application executing on the user device. At operation 204, the user device presents the instructions. For example, the instructions are presented in a user interface of the service application. At operation 208, the user device receives a rule. For example, the rule may be received from another server (e.g., the server 106) and can indicate a first condition associated with the online delivery service. This rule can enable the user device to detect whether a deviation from the instructions has occurred. The deviation occurs when the first condition is met. At operation 210, the user device stores user data. The user data can indicate a second condition associated with presenting a feedback request page. The user data can correspond to a user setting of the service application. The user setting can be set manually via the user interface or automatically by being received from another server (e.g., the server 112).

In an example, the flow includes operation 212, where the user device determines that the first and the second condition have been met. The first condition can be met by monitoring sensor data of the user device and comparing this data to parameters of the instructions (e.g., the user device is at a different location than an instructed location; the user device is in motion at a speed that exceeds a threshold during a time period whereas the instructions indicate that a break should be taken during that time period and, thus, the user device should be stationary or nearly stationary, etc.). The second data can be met by monitoring device data and comparing this data to parameters of the user data (e.g., the current time and/or the current device location allows the feedback request page to be presented).

In an example, the flow includes operation 214 where the user device requests feedback data from the user. This may be in the form of the feedback request page displayed on the user device via the service application. In an example, the flow includes operation 216 where the user device receives feedback data. This feedback data may be based on user input at the feedback request page. In addition, the feedback data may be based on a lack of user input at the feedback request page (e.g., if the user did not input any information at the feedback request page, the lack of input is used as negative feedback about the presentation of the feedback request page). In another example, if the user waited a period of time and responded to the feedback data at a different time than when the feedback request page was presented (e.g., responded during a break), this information can also be collected to further refine the user setting for subsequent presentations of feedback request pages. In an example, at operation 218, the user device sends the feedback data to a server. As discussed with reference to FIG. 1, the feedback data is sent to the first server (e.g., the server 108) and used to improve future delivery instructions. The feedback data related to the timing of the user input at the feedback request page and/or the lack of user input can also be sent to the second server (e.g., the server 106) and/or the third server (e.g., the server 112) to further refine the rule and/or the user data. For example, an update to the rule can be sent from the second server and received and subsequently used by the user device, where this update can relate to the first condition. Further, an update to the user data can be sent from the third server and received and subsequently used by the user device, where this update can relate to the second condition.

To illustrate the method of FIG. 2, the user device receives instructions that the user should be taking a break (e.g., at a particular location and/or during a particular time period) and presents those instructions to the driver. The rule may indicate that if the driver is not taking a break (e.g., a different location is used, a different time period is used, or no break at all is taken), a request for feedback should be sent requesting the reasons for the deviation. The user device receives user data defining a setting to send the feedback request page only while the user is traveling a walking speed. In the example, during the particular time that the user is instructed to be on a break, the user completes a delivery and submits a delivery confirmation via the service application. The first condition is met because the delivery confirmation indicates a deviation from the instructed break. The second condition is also met because the device data indicates a motion of the user device, where the motion has a velocity below a threshold value.

Figure 3:
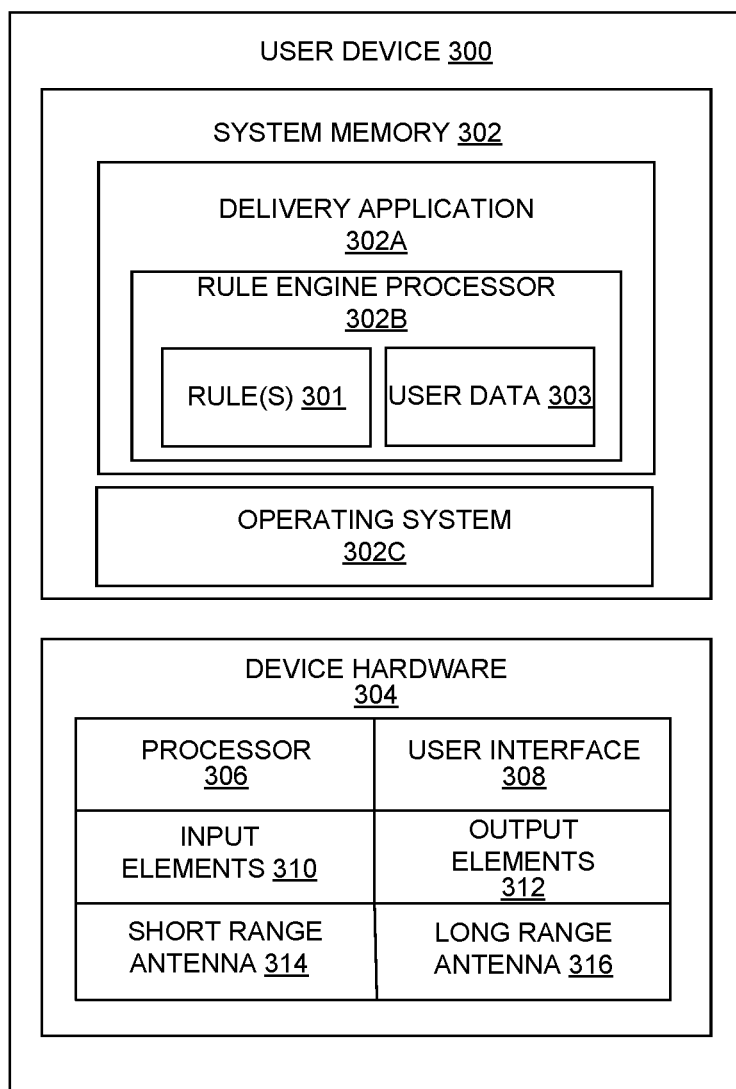
FIG. 3 illustrates an example of a user device, according to embodiments of the present disclosure.

This low velocity corresponds to the user walking back from the delivery location. Because the first and second condition are met, the user device will present the feedback request page (e.g., while the user is still walking, or is back at the delivery vehicle, but has not started driving yet). The user may provide input in the feedback request page indicating that they preferred to take a break at a later time on the route when they will be near their favorite coffee shop. This information may be sent to the first server and used for future delivery instructions. For this particular user profile, the next delivery instructions may include a break that is scheduled at the later time and that coincides with a location that is closer to the user's favorite coffee shop. FIG. 3 illustrates an example of a user device 302, according to embodiments of the present disclosure. The user device 300 is an example of the user devices described herein above. As illustrated, the user device 300 may include device hardware 304 coupled to a system memory 302.

Device hardware 304 may include a processor 306, a short-range antenna 314, a long-range antenna 316, input elements 310, a user interface 308, and output elements 312 (which may be part of the user interface 308). Examples of input elements may include microphones, keypads, touchscreens, sensors, etc. Examples of output elements may include speakers, display screens, and tactile devices. The processor 306 can be implemented as one or more integrated circuits (e.g., one or more single core or multicore microprocessors and/or microcontrollers) and is used to control the operation of mobile communication device 300. The processor 306 can execute a variety of programs in response to program code or computer-readable code stored in the system memory 302 and can maintain multiple concurrently executing programs or processes.

The long-range antenna 316 may include one or more RF transceivers and/or connectors that can be used by mobile communication device 300 to communicate with other devices and/or to connect with external networks. The user interface 308 can include any combination of input and output elements to allow a user to interact with and invoke the functionalities of mobile communication device 300. The short-range antenna 809 may be configured to communicate with external entities through a short range communication medium (e.g., using Bluetooth, Wi-Fi, infrared, NFC, etc.). The long-range antenna 819 may be configured to communicate with a remote base station and a remote cellular or data network, over the air.

The system memory 302 can be implemented using any combination of any number of non-volatile memories (e.g., flash memory) and volatile memories (e.g., DRAM, SRAM), or any other non-transitory storage medium, or a combination thereof media. The system memory 302 may store computer code, executable by a processor, for performing any of the functions described herein. For example, the system memory 302 may comprise a computer readable medium comprising code, executable by the processor 306, for implementing a method comprising: executing a program code of a delivery application associated with a user profile; receiving, from a first server, instructions related to providing a delivery service; presenting the instructions at a user interface of the delivery application; receiving, from a second server, a rule, wherein the rule is associated with the delivery service and indicates that feedback data is to be requested when a first condition related to a deviation from the instruction is met; storing user data indicating a second condition to present a page configured to collect the feedback data, wherein the user data is based at least in part on the user profile; determining sensor data of one or more sensors of the user device; determining that the first condition is met based at least in part on the sensor data; determining that the second condition is met based at least in part on device data of the user device; presenting, based at least in part on the first condition and the second condition being met, the page in the user interface of the delivery application; receiving the feedback data based on a user input at the page; and sending the feedback data to the first server.

The system memory 302 may also store a delivery application 302A (e.g., an example of the service applications described herein above) and an operating system 302C. The delivery application 302A may include instructions or code to provides a rule engine processor 302 can present feedback request pages via the user interface 308. The rule engine processor 302 can store a set of rules 301 specifying a set of conditions that, when met, permit the presentation of a feedback request page(s). The rule engine processor 302 can also store user data 303 specifying a set of conditions that, when met, trigger the automatic presentation of the feedback request page(s). The delivery application 302A can receive sensor data and device data from the device hardware 304. Such data is assessed against the conditions to control the presentation of the of the feedback request page(s).

Figure 4:
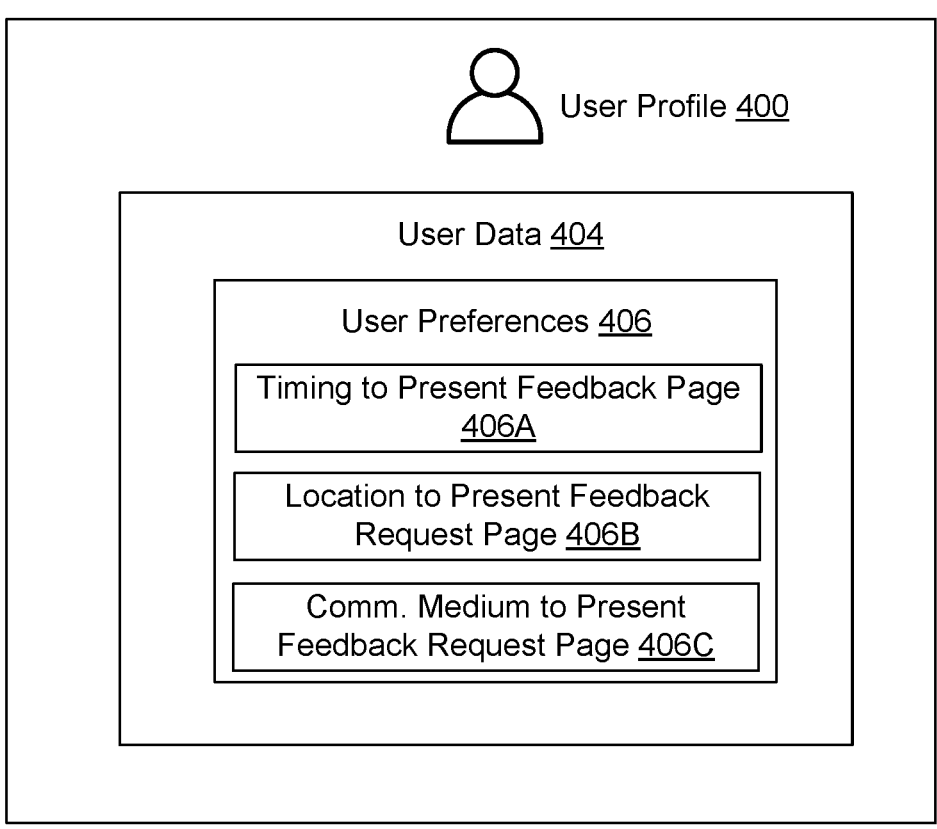
FIG. 4 illustrates an example of a user profile, according to embodiments of the present disclosure.

FIG. 4 illustrates an example of a user profile 400, according to embodiments of the present disclosure. The user profile 400 may be stored in association with the delivery application 302A. The user profile 400 contains user data 404 indicating conditions to trigger the presentation of a feedback request page. In a way, the conditions can represent user preferences 406 for when, where, and/or how the feedback request page can be presented. In particular, the user preferences 406 may specify timing 406A to present a feedback request page, a location 406B that the user device 300 needs to be at to present feedback request page, and/or a communications medium for the presentation (e.g., that the feedback request page can be presented via a user interface of the delivery application 302A, via another application, such as an electronic mail application, and/or via another user interface of the user device 300, such via a phone interface).

To illustrate, a driver may be associated with a user profile. The driver might prefer to receive notifications during their break while they are stopped at their favorite coffee shop. This information can be saved in a user profile 400 stored in a cloud based computing service and accessible on any compatible user device upon proper authentication. If the driver uses a company issued device and receives a different device during each new shift, the drive may log into their user profile 400 and the user device may then access the user data 404.

The user data 404 may also include information regarding the previous success of the user's feedback (e.g., the previous success can be measured with a quality indication), the length of time that the driver has been a driver, the number of shifts that the driver has completed, etc. The quality indication can be a score, or some other value, describing whether a feedback request page was presented and, if so, whether feedback data was generated based on this page. This score (or value) can also or alternatively describe whether the feedback data was helpful (e.g., resulted in a change to the online delivery service at least for the user profile 400, a change to the rule, or a change to the user data 404). Drivers with a greater trust score may be asked certain questions that other drivers are not, or their feedback may be flagged as more likely to be relevant. This all contributes to a more efficient collection of feedback data and a greater likelihood of success at improving future delivery instructions.

Figure 5:
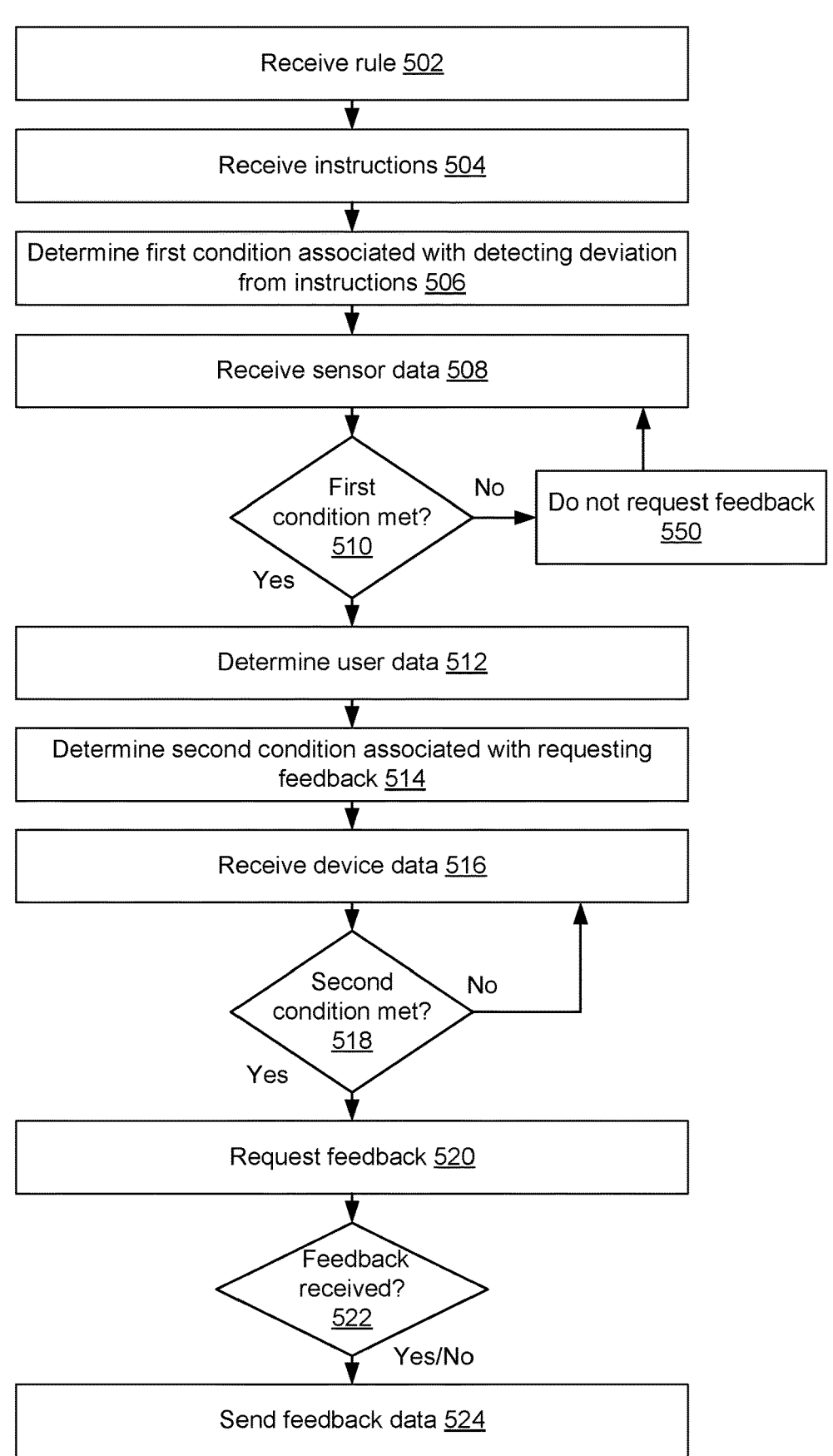
FIG. 5 illustrates an example of a flow for requesting feedback and sending the feedback data to a server, according to embodiments of the present disclosure.

FIG. 5 illustrates an example of a flow for requesting feedback and sending the feedback data to a server, according to embodiments of the present disclosure. As described below, operations of the flow can be performed by a user device (e.g., the user device 102 or 300). Some or all of the instructions for performing the operations can be implemented as hardware circuitry and/or stored as computer-readable instructions on one or more computer-readable storage media of the user device. As implemented, the instructions represent modules that include circuitry or code executable by processor(s) of the user. The use of such instructions configures the user to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 502, where the user device receives a rule. This rule can be received from a first server and can be associated with an online delivery service executing on a second server. The rule can specify a first condition that needs to be met to trigger the collection of feedback data about one or more aspects of the online delivery service. The first condition being met can correspond to a deviation from instructions provided by the online delivery service.

In an example, the flow also includes operation 504, where the user device receives the instructions. For instance, the instructions can be received from the second server and can be presented at a user interface of the user device. At operation 506, the user device can determine the first condition associated with detecting the deviation from the instructions. For example, the user device can parse the rule to determine the first condition. At operation 508, the user device receives sensor data. The sensor data can be generated by one or more sensors of the user device, collected over time, and can include motion data, location data, velocity data, acceleration data, IMU data, and the like. At operation 510, the user determines whether the first condition is met. For instance, the sensor data is compared to parameters (e.g., time, location, etc.) of the first condition. Depending on the comparison (e.g., the sensor data indicates a velocity that exceeds a threshold value, whereas the parameters indicate that the velocity should be near zero), the user device can determine if the first condition is met or not. If not met, the flow proceeds to operation 550, whereby the user device determines no feedback needs to be requested. Here, the flow may loop back to operation 508 to continuously receive and process additional sensor data. If the first condition is met, the flow proceeds to operation 512.

In an example, the flow includes operation 512, where the user determines user data. The user data can be stored as a user setting, where this user setting can be manually defined via the user device and/or can be defined based on input of a third server. The user data can indicate a second condition that needs to be met to trigger the presentation of a feedback request page. The second condition being met can correspond to a user preference for when, where, and/or how the feedback request page can be presented. At operation 518, the user determines whether the second condition is met. For instance, the device data is compared to parameters (e.g., time, location, etc.) of the second condition. Depending on the comparison (e.g., the device data indicates no motion, whereas the parameters indicate that the presentation is permitted when the user device is stationary), the user device can determine if the second condition is met or not. If not met, the flow loops back to operation 516, whereby the user device continues to receive and process additional device data. If the second condition is met, the flow proceeds to operation 520.

At operation 520, the user device requests feedback related to the instructions and/or the online delivery service. The request can take the form of presenting the feedback request page. At operation 522, the use device determines whether the feedback is received. For example, user input can be received at the feedback request page within a time period after this page is first presented. Feedback data can be generated based on this input. Otherwise, no such user input is received, indicating that no feedback is received. In this case also, feedback data can be generated, but this feedback data indicates that no user input was received (e.g., is negative feedback about the presentation of the feedback request page, rather than being feedback directed to the instructions and/or online delivery service). In both cases, the flow proceeds to operation 524, where the user device sends the feedback data. For example, the feedback data is sent to the second server.

Figure 6A:
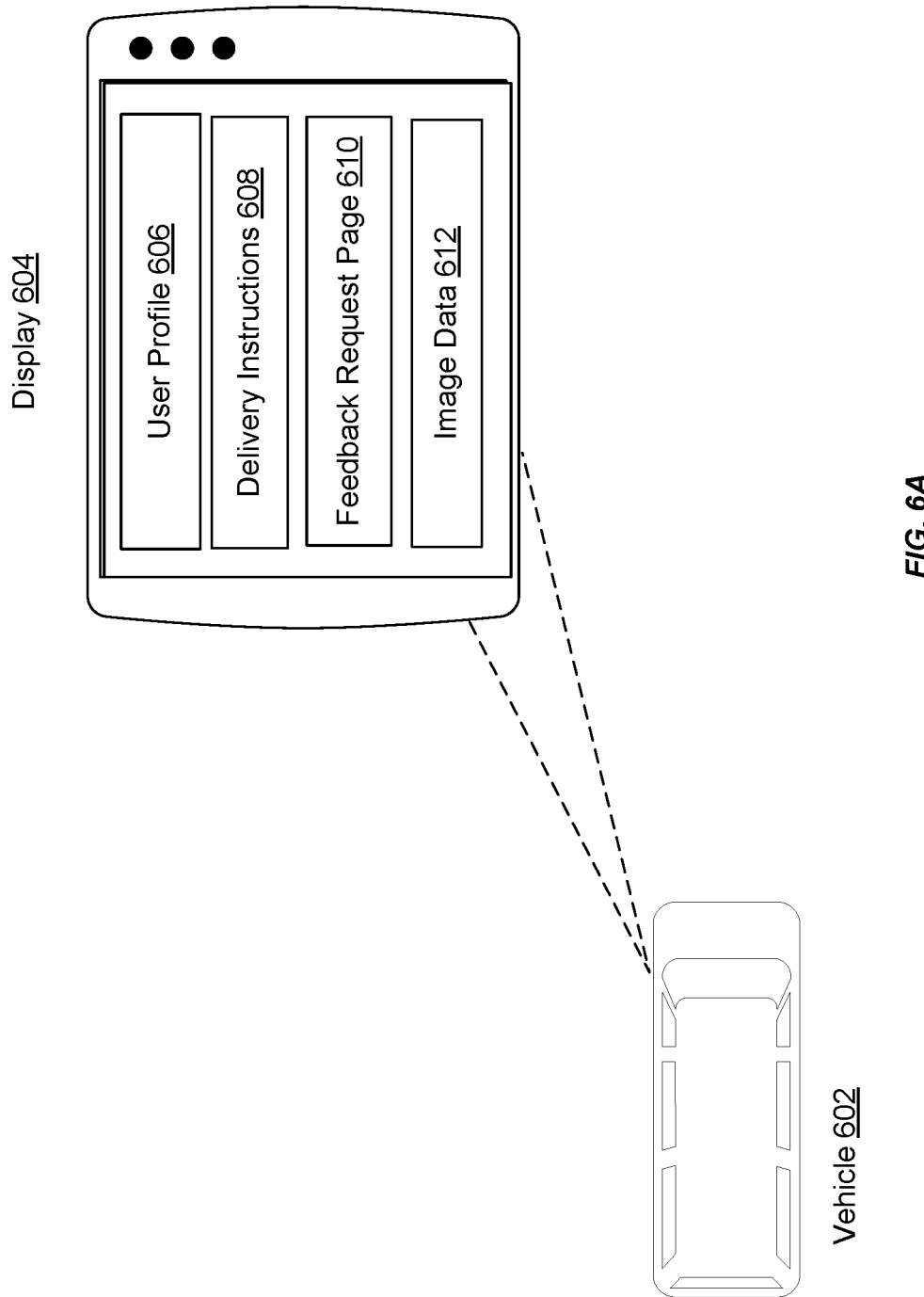
FIG. 6A illustrates an example of a vehicle enabled to collect user feedback data, according to embodiments of the present disclosure.

FIG. 6A illustrates an example of a vehicle 602 enabled to collect user feedback data, according to embodiments of the present disclosure. The vehicle 602 may include different components (including a display 604) that can be communicatively coupled (e.g., using a wireless or wired data connection) with a user device 614 (shown in FIGS. 6B and 6C) to provide a more seamless user experience as well as enhance the capabilities of the user device 614 by providing access to additional data.

As illustrated in FIG. 6A, a user may operate and drive the vehicle 602 as part of delivering items. The vehicle 602 may be equipped with the display 604. The display 604 may be configured to receive and present, for example, a user profile 606 of the user, delivery instructions 608, a feedback request page 610, and image data 612. Each received piece of information can be received from a remote server, another component of the vehicle 602, an/or the user device 614.

The vehicle 602 may be equipped with various sensor that produce sensor data such as global positioning system (GPS) tracking capabilities or image data capabilities (discussed below in reference to FIG. 6C). To illustrate, if a condition requires that the user be traveling at a speed that is less than one mile per hour in order to present the feedback request page 610, then the GPS sensor data on the vehicle 602 may be used to determine whether this velocity condition is met or not. If met, the feedback request page 610 can be presented on the display 604.

Figure 6B:
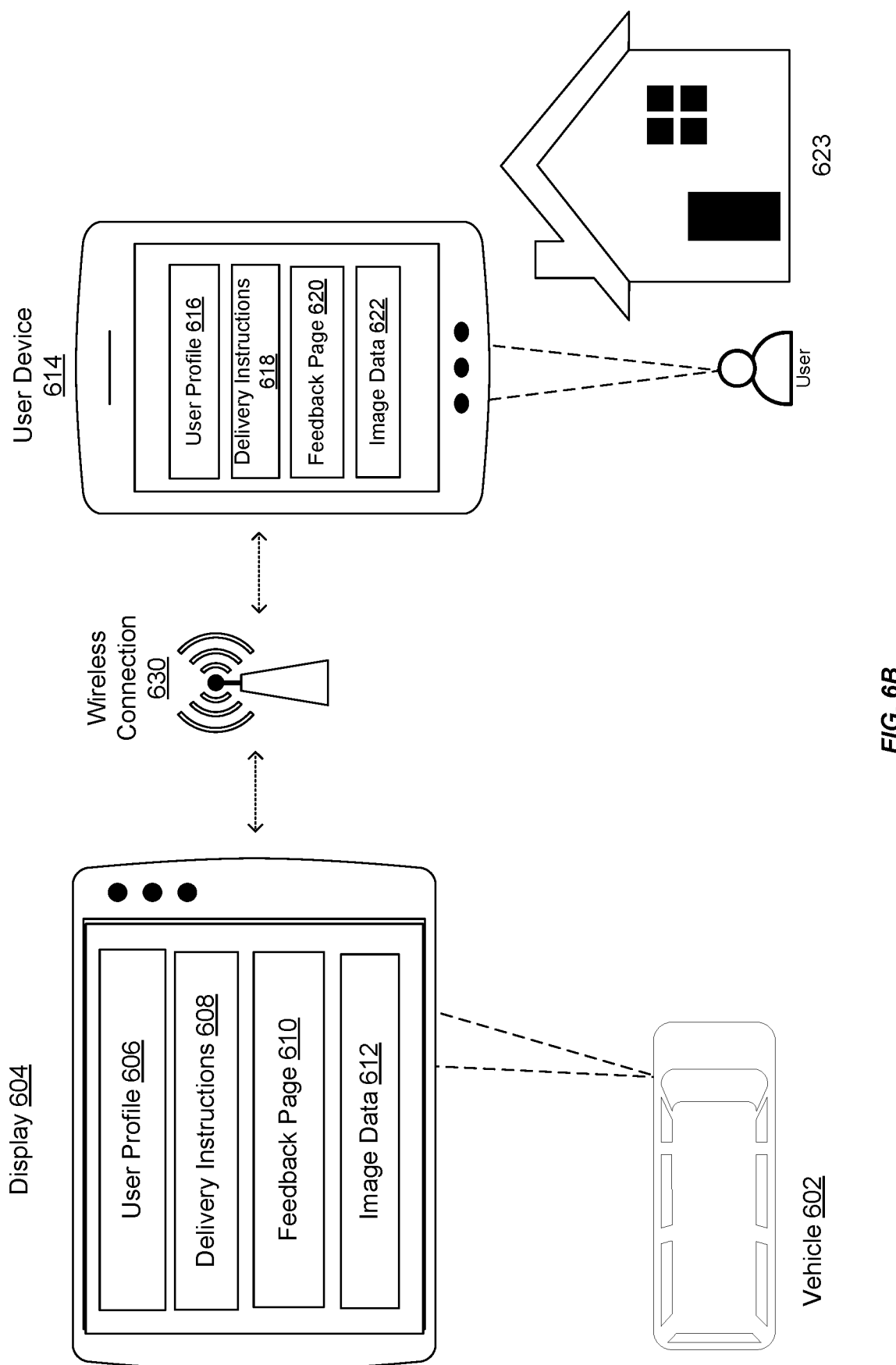
FIG. 6B illustrates an example of a user device enabled to request user feedback data and display the feedback data based on surrounding conditions, according to embodiments of the present disclosure.

FIG. 6B illustrates an example of the user device 614 enabled to request user feedback data and display the feedback data based on surrounding conditions, according to embodiments of the present disclosure.

The user device 614 may receive and present a user profile 606, device delivery instructions 618, a feedback request page 620, and/or image data 622. The image data 622 may be generated by a camera of the user device 614 and/or received from a camera of the vehicle 602. The user device 614 and the display 604 (or some other component of the vehicle 602, such as a hub that enables the user device 614 to communicate with the display 604 and other vehicular components) may be connected via a wireless connection 630 (e.g., using the BLUETOOTH protocol).

In the same example as described above in reference to FIG. 6A, while the user is delivering a package to a house 623, the sensor data on either the user device 614 or the vehicle 602 would reveal that the user is travelling at a speed that is less than one mile per hour. Thus, a feedback request page may be displayed. If the display 604 is communicatively coupled with the user device 614 (e.g., the wireless connection 630 is established between the two), the contents of the user device 614 may be displayed on the vehicle display 604 (e.g., such that the user device's 614 display is mirrored). In this case, the feedback request page 610 can be presented on the display 604 of the vehicle 602, rather than the user device 614. However, it may be determined that it is more preferable to display the feedback request page on the use device 614 directly (e.g., based on the user profile 606 or 616 indicating a user preference, based on time duration after the delivery, such as for the next thirty seconds, the feedback request page 620 is presented on the user device 614, and thereafter the feedback request page 610 is presented on the display 604, or based on a received signal strength indicator (RSSI) associated with the wireless connection 630, whereby an RSSI less than a threshold value indicates that the user device 614 is still remote from the vehicle 602 and, thus, the feedback request page 620 is presented, whereas the RSSI exceeding the threshold value indicates that the user device 614 is located in the vehicle 602 and, thus, the feedback request page 610 is presented).

Figure 6C:
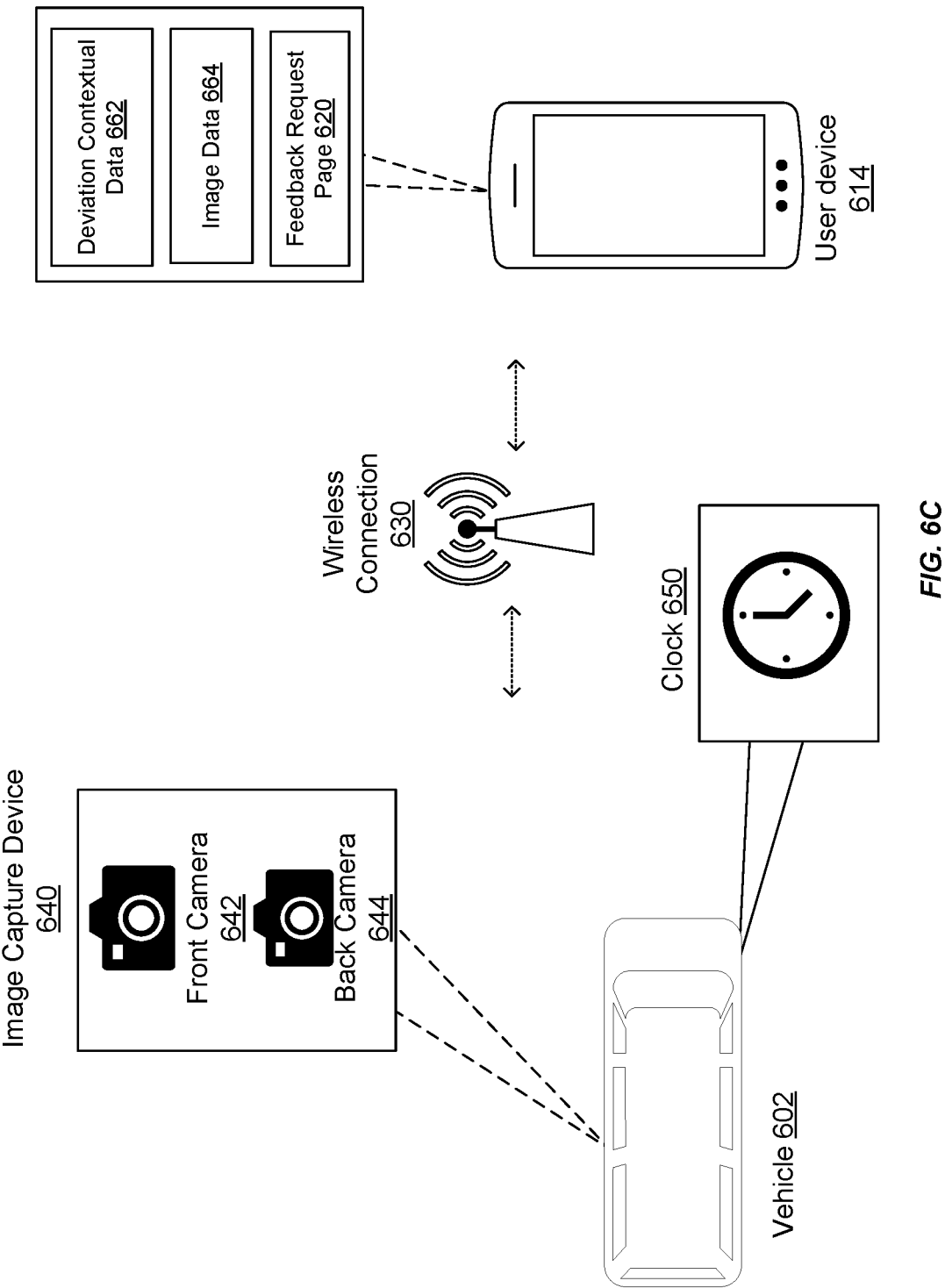
FIG. 6C illustrates an example of a vehicle enabled to capture image data and synchronize the image the data with a detected deviation, according to embodiments of the present disclosure.

FIG. 6C illustrates an example of the vehicle 602 enabled to capture image data and synchronize the image the data with a detected deviation, according to embodiments of the present disclosure. The image data and the detected deviation may be synchronized to present the image data along with the feedback request page 660.

As illustrated in FIG. 6C, the vehicle 602 may be equipped with an image capture device 640 which may include a front camera 642 (e.g., placed at the front of the vehicle 602, a back camera 644 (e.g., placed in the rear of the vehicle 602), and/or other cameras. The vehicle 602 may be further equipped with any number of sensors to collect various sensor data, such as a location sensor to collect location data. The vehicle 602 may also be equipped with a clock 650 that keeps track of the current time. Image data generated by the image capture data 640 can be synchronized with a deviation from delivery instructions detected by the user device 614 using different techniques.

In one example technique, the user device 614 detects the deviation and generates contextual data 662 about the deviation. The contextual data 662 can indicate the timing and/or the location of the deviation. When the image capture device 640 generates image data (representing images or a video), the image capture device 640 can time stamp the image data (based on the timing signal of the clock 650) and generate metadata about the image data, where the metadata includes location data (e.g., based on the location sensor). The time stamped image data and the related metadata can be stored at a data store local to the vehicle 602 or remote therefrom. The user device 614 can query the data store using the contextual data 662 (e.g., the timing data and/or location data of the deviation). The query result can include the image data. This image data can then be presented at user device 614 (and/or, as described in FIG. 6B, on the display 604). The image presentation can be included in the presentation of the feedback request page 620 (or the feedback request page 610 as the case may be).

In one example technique, the synchronization is performed by a component of the vehicle 620. For example, the contextual data 662 is sent to a processor of the vehicle 602 that then queries the data store and receives back the image data.

In yet another example technique, the synchronization is performed by a server (e.g., the server 108 of FIG. 1). Here, the server receives the image data from the image capture device 604 and the contextual data 662 and performs the synchronization.

In a further technique, the synchronization is performed automatically as the deviation occurs, rather than after the fact. In particular, when the user device 614 detects the deviation, the user device 614 triggers the image capture device 640 to generate the image data (e.g., by sending a command thereto). The image data is only generated upon this trigger and can be sent to the user device 614 and/or to the server. Because the deviation detection is used as a trigger, the image data is assumed to be associated with the deviation. No additional synchronization may be needed.

In FIG. 6C, the use of cameras and image data is provided for illustrative purposes only. The embodiments of the present disclosure are not limited as such. Instead, the embodiments similarly and equivalently apply to any sensor installed in, integrated with, or interfacing with the vehicle 602 and to the synchronization of sensor data of such sensor with feedback data. For example, the vehicle 602 may include a speedometer unit. Upon detecting a deviation, speedometer data may be synchronized with the feedback data.

Figure 7:
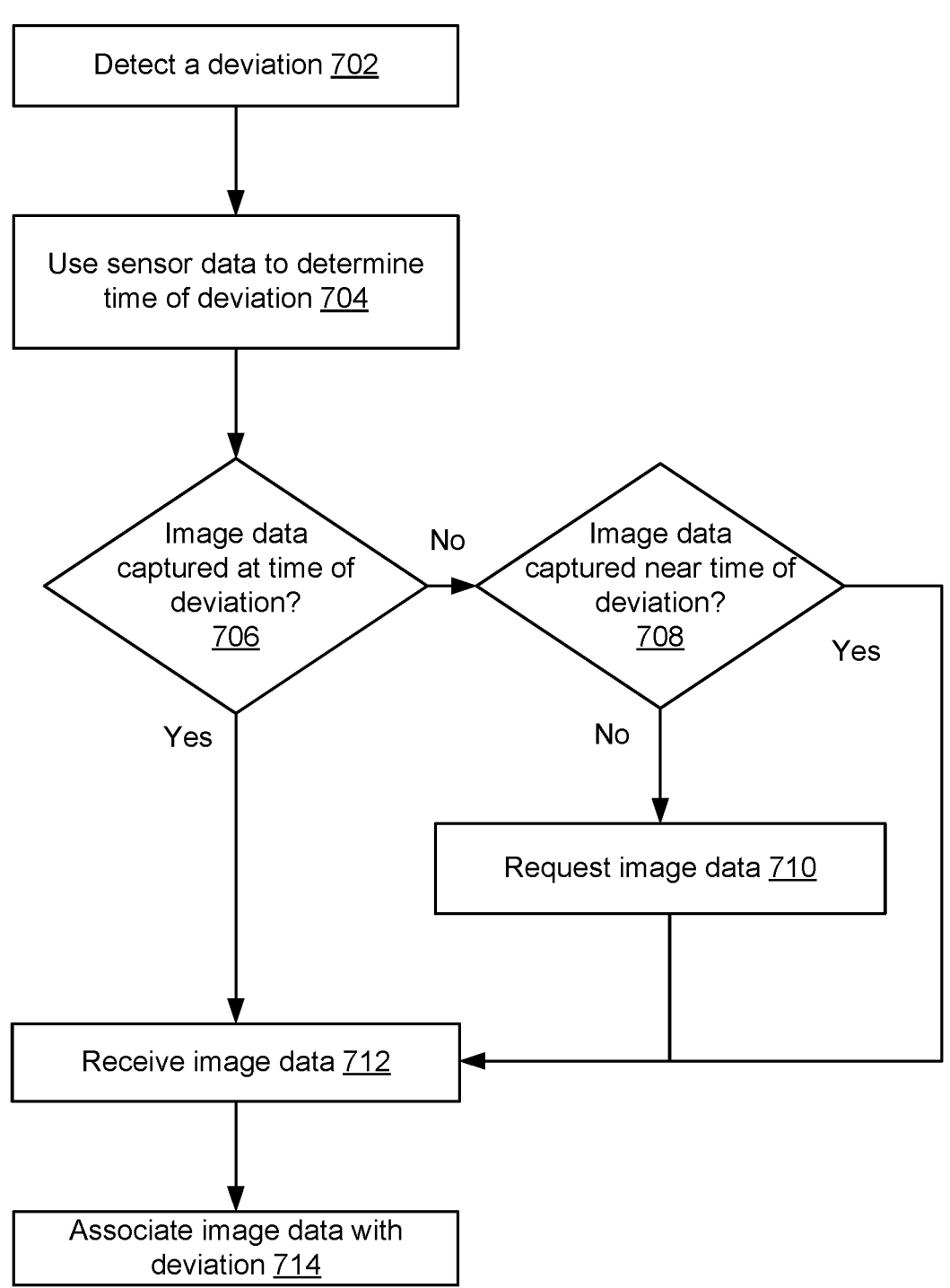
FIG. 7 illustrates an example of a flow of synchronizing image data with a detected deviation, according to embodiments of the present disclosure.

FIG. 7 illustrates an example of a flow of synchronizing image data with a detected deviation, according to embodiments of the present disclosure. As described below, operations of the flow can be performed by a computer system such as the server 108 or the user device 102. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 702 in which a deviation is detected. As illustrated, the flow includes operation 704 where the timing of the deviation is detected using timing data of a clock signal. In an example, as illustrated, the flow includes operation 706 where it is determined if image data was captured at the time determined at operation 704. As discussed with reference to FIG. 6C, the image data may be captured continuously, periodically, or requested. This is illustrated in this flow at operation 706, if image data was already captured at the determined time, then it is received at operation 712.

Alternatively, if image data was not captured at the time determined at operation 704, then it may be determined that data was captured near the time at operation 708 (e.g., within a predefined time period before and/or after the deviation is detected). If so, operation 712 is performed, where the image data is received. Otherwise, operation 710 is performed, where the image data is requested (e.g., by triggering the image capture device 604 to generate it). Once the image data is received, operation 714 can be performed, where this image data is associated with the deviation.

In summary, the method of synchronizing the image data and the deviation is done by collecting image data from at or near the time that the deviation was detected. To illustrate, if a camera on the vehicle is configured to continuously take image data (e.g., record a video during the route, or take a picture every second), then when a deviation is detected at, for example, 11:43 AM, image data that was captured at 11:43 AM can be received. Alternatively, cameras may be configured to take a photo every ten minutes. Using the same example, image data that was capture at 11:40 AM may be received. Alternatively, the method may include requesting image data. For example, when a deviation is detected at 11:43 AM, the system requests image data and receives the image data. It should be noted that the order of operations and sequential nature in the figure are exemplary and should not be construed as limiting the claims.

Figure 8:
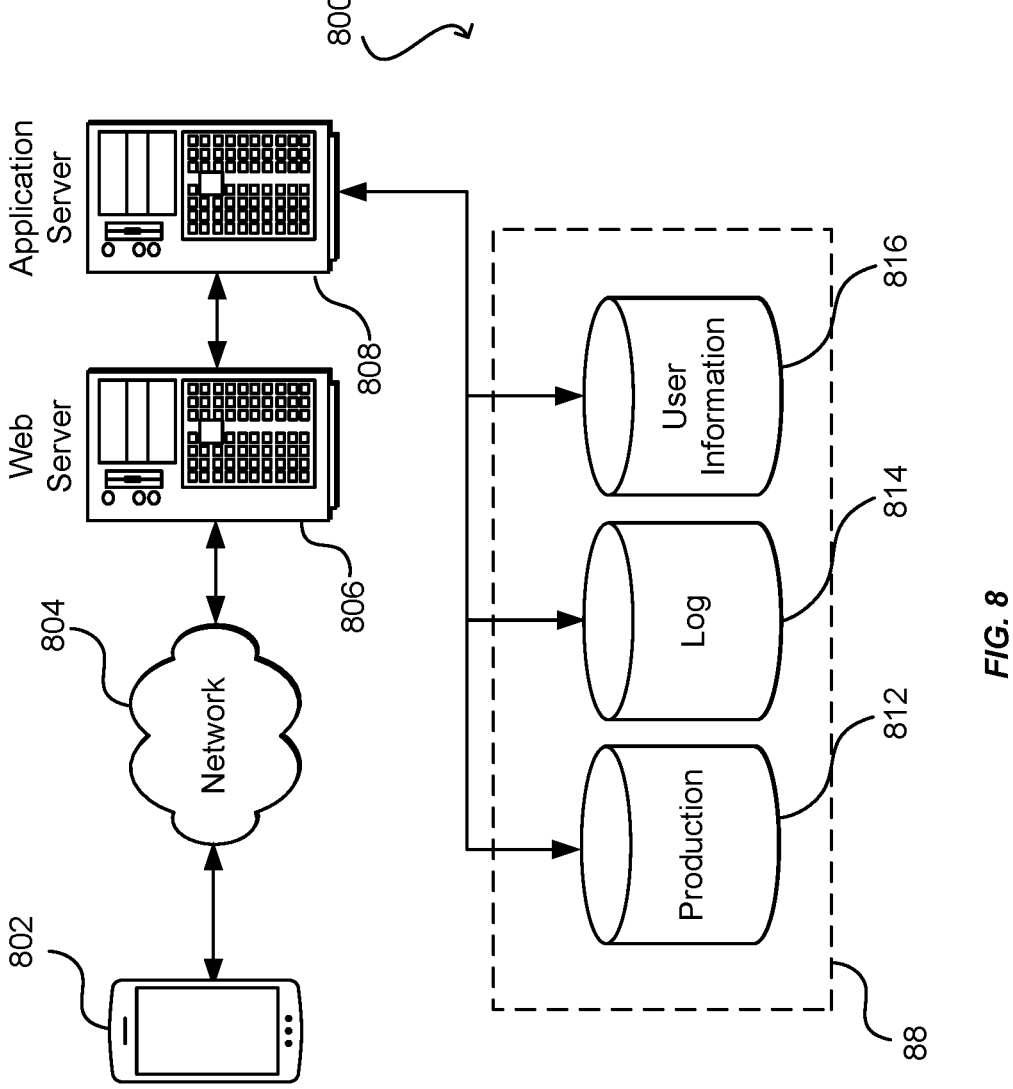
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802 (such as any of the user devices described herein above), which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A user device comprising:

one or more processors; and one or more memories storing a program code for a delivery application, wherein the delivery application is associated with a user profile, and wherein upon execution of the program code by the one or more processors, the user device is configured to:

receive, from a first server, instructions related to providing a delivery service, the instructions indicating a location at a particular time as part of a route for the delivery service;

present the instructions at a user interface of the delivery application;

receive, from a second server, a rule, wherein the rule is associated with the delivery service and indicates that feedback data is to be requested when a location condition related to a deviation from the instructions is met;

receive, from a third server, user preference data based at least in part on the user profile, the user preference data indicating a timing condition to present a page configured to collect the feedback data;

determine sensor data of a location sensor of the user device, the sensor data generated at the particular time;

detect the deviation by determining that the location condition is met based at least in part on the sensor data;

determine timing data of the user device, the timing data available based at least in part on a clock signal of the user device;

determine that the timing condition is met based at least in part on the timing data;

present, based at least in part on the location condition and the timing condition being met, the page in the user interface of the delivery application;

receive the feedback data based on a user input at the page; and send the feedback data to the first server.

2. The user device of claim 1, wherein upon execution of the program code by the one or more processors, the user device is further configured to:

receive, from the first server, additional instructions related to providing the delivery service, wherein the additional instructions are based at least in part on the feedback data.

3. The user device of claim 1, wherein the timing data indicates a second particular time, and wherein upon execution of the program code by the one or more processors, the user device is configured to:

determine second sensor data of the location sensor, the second sensor data corresponding to the second particular time;

based at least in part on the second sensor data indicating a change to the location, determine movement of the user device at a speed exceeding a threshold value; and delay the presentation of the page based at least in part on the movement of the user device.

4. The user device of claim 1, wherein the timing data indicates a second particular time, and wherein upon execution of the program code by the one or more processors, the user device is configured to:

determine, at the second particular time, that the user device is paired with a vehicle device that includes a display, wherein the page is presented on the display.

5. A method implemented by a user device, the method comprising:

executing a program code of an application associated with a user profile;

receiving, from a first server, instructions related to providing a service;

presenting the instructions at a user interface of the application;

receiving, from a second server, a rule associated with the service and indicating that feedback data is to be requested when a first condition related to a deviation from the instruction is met;

storing user data indicating a second condition to present a page configured to collect the feedback data, wherein the user data is based at least in part on the user profile;

determining sensor data of one or more sensors of the user device;

determining that the first condition is met based at least in part on the sensor data;

determining that the second condition is met based at least in part on device data of the user device;

presenting, based at least in part on the first condition and the second condition being met, the page in the user interface of the application;

receiving the feedback data based at least in part on a user input at the page; and sending the feedback data to the first server.

6. The method of claim 5, further comprising:

presenting, at the user interface, a notification to take a break, wherein the instructions set a first time and a first location for the break, wherein the first condition is determined to be met by determining that the sensor data indicates a second location of the user device at the first time or the first location of the user device at a second time.

7. The method of claim 5, wherein the user data is received from a third server that is configured to generate the user data based at least in part on historical user feedback input via the application.

8. The method of claim 5, wherein determining that the second condition is met is further based at least in part on a set of parameters indicated by the user data and an attribute of the service, wherein the attribute includes at least one of a type or an identifier of the service, and wherein the set of parameters indicates that the page is to be presented for services that has the attribute.

9. The method of claim 5, wherein determining that the second condition is met is further based at least in part on a set of parameters indicated by the user data and an attribute of the application, wherein the set of parameters indicates that the page is to be presented via a communication medium, and wherein the attribute indicates that the application is associated with the communication medium.

10. The method of claim 5, further comprising:

receiving, from the second server, an updated rule, the updated rule generated based at least in part on the feedback data sent to the first server.

11. The method of claim 5, wherein the service, the rule, the feedback data, the page, and the instructions are a first service, a first rule, first feedback data, first page, and first instructions, respectively, and wherein the method further comprises:

receiving, from the first server, second instructions related to providing a second service;

receiving, from the second server, a second rule indicating that second feedback data is to be requested when a third condition associated with the second instructions is met;

determining that the third condition is met, presenting, based at in part on the second condition and the third condition being met, a second page configured to collect the second feedback data;

determining that no user input is received at the second page;

sending an indication to the first server that no feedback data was collected from the user device for the second instructions; and receiving, from the second server, an update to the second rule based at least in part on the indication.

12. The method of claim 5, further comprising:

determining image data generated by a camera of a vehicle in which the user device is located;

generating an association between the image data and the deviation; and performing at least one of: presenting the image data in the page or sending the image data with the feedback data to the first server.

13. The method of claim 12, further comprising:

determining a timestamp for when the deviation occurred;

querying, a data store storing images generated by the camera, using the timestamp; and receiving, from the data store, the image data.

14. The method of claim 12, the method further comprising:

detecting that the deviation has occurred based at least in part on the first condition being met; and triggering, based at least in part on the deviation, the camera to generate image data.

15. The method of claim 5, further comprising:

receiving, from a third server, the user data, wherein the user data indicates a user preference regarding when to present the page, wherein the second condition includes a timing condition that is based at least in part on the user preference.

16. The method of claim 5, further comprising:

receiving, from a third server, the user data, wherein the user data indicates a user preference regarding a location for presenting the page, wherein the second condition includes a location condition that is based at least in part on the user preference.

17. One or more computer-readable storage media storing program code for an application, the program code executable by one or more processors to cause operations including:

receiving, from a first server, instructions related to providing a service;

presenting the instructions at a user interface of the application;

receiving, from a second server, a rule associated with the service and indicating that feedback data is to be requested when a first condition related to a deviation from the instruction is met;

storing user data indicating a second condition to present a page configured to collect the feedback data;

determining sensor data of one or more sensors;

determining that the first condition is met based at least in part on the sensor data;

determining that the second condition is met based at least in part on device data;

presenting, based at least in part on the first condition and the second condition being met, the page in the user interface;

receiving the feedback data based at least in on a user input at the page; and sending the feedback data to the first server.

18. The one or more computer-readable storage media of claim 17, wherein the operations further comprise:

receiving, from the first server, additional instructions related to providing the service, wherein the additional instructions are based at least in part on the feedback data;

based on detecting that no deviation related to the additional instructions has occurred, generating a quality indication of the feedback data; and updating a user profile associated with the application to indicate that the quality indication.

19. The one or more computer-readable storage media of claim 17, wherein the operations further comprise:

determining a total number of pages presented via the user interface during a first time period and associated with feedback collection; and based at least in part on the total number, delaying a presentation of the page for a second time period.

20. The one or more computer-readable storage media of claim 17, wherein the user interface is presented by a user device, and wherein the operations further comprise:

sending, with the feedback data, contextual data indicating at least one of a timing of when the first condition was met or a location of where the deviation occurred; and wherein the feedback data is associated at the first server with image data based at least in part on the contextual data, wherein the image data is generated by a camera of a vehicle where the user device was located at the timing.

\*   \*   \*   \*   \*